Patented Oct. 1, 1935

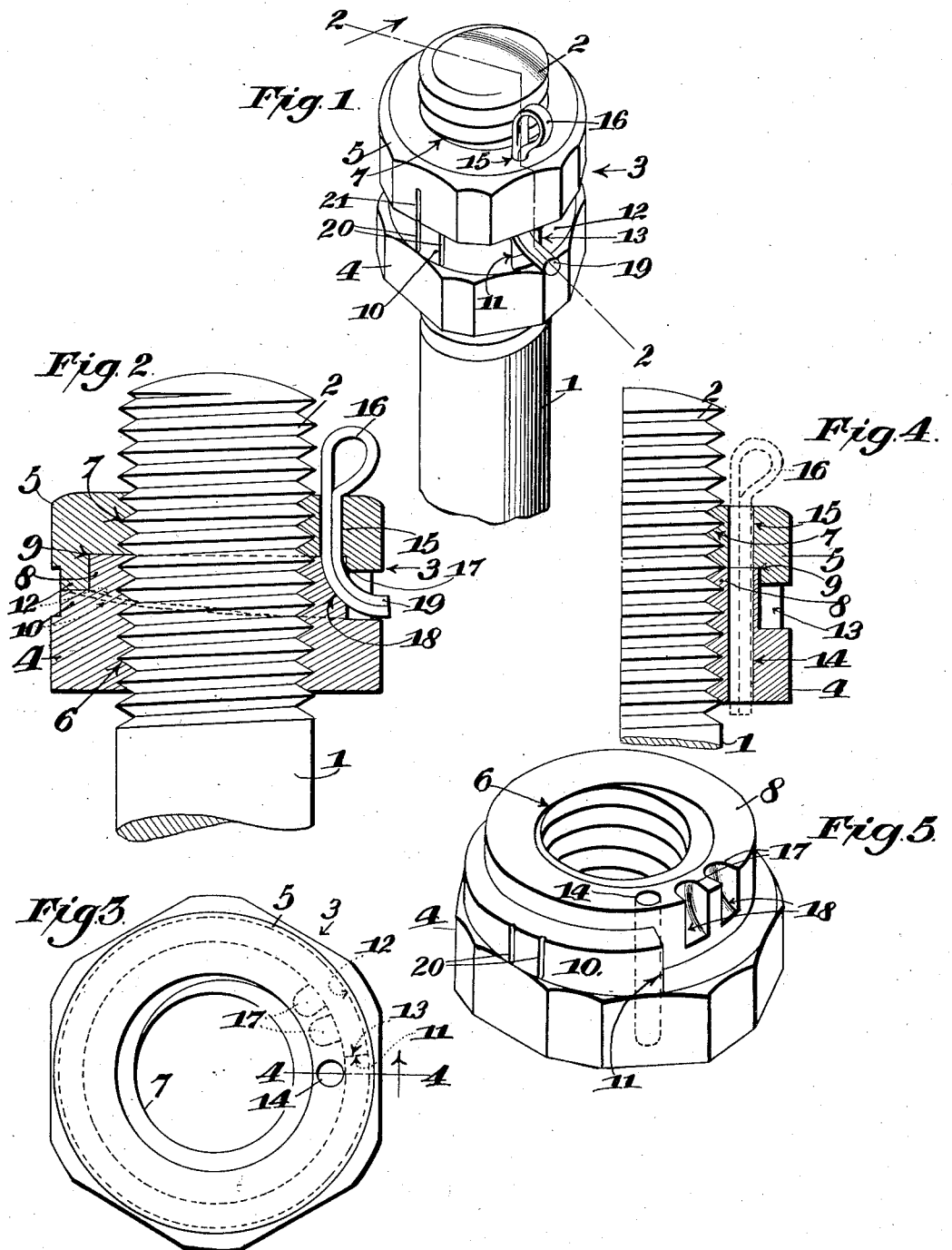
Oct. 1, 1935. C. L. FREELAND 2,016,000
NUT LOCK
Filed Aug. 22, 1934

2,016,000

UNITED STATES PATENT OFFICE 2,016,000

NUT LOCK

Claude L. Freeland, Bristow, Okla.

Application August 22, 1934, Serial No. 740,989

3 Claims. (Cl. 151—15)

This invention relates to improvements in nut locks, and its objects are as follows:—

First, to provide a nut lock wherein the main and check nuts have an interengaging upstanding flange and circular chamber for the purposes of quickly and accurately alining the two thread passages preparatory to screwing the composite nut onto a threaded member.

Second, to provide the main and check nuts with an interengaging upstanding flange and circular chamber to insure holding the composite nut together when loosely secured by a cotter pin or the like temporarily inserted through registering holes as when packing the composite nut for shipping.

Third, to notch the edge of said upstanding flange at one or more places for the purpose of deflecting the cotter pin when inserted in one of the foregoing holes and directed into the notch, this for the purpose of locking the main and check nut in an interlocked position when the check nut is backed up upon the cam surface, there being confronting cam surfaces on the two nuts.

In the drawing: —

Figure 1 is a perspective view of a nut lock made in accordance with the invention, particularly illustrating how the deflected cotter pin holds the main and check nuts in the interlocked position.

Figure 2 is a vertical section taken on the line 2—2 of Figure 1, the bolt being shown in elevation.

Figure 3 is a plan view of the composite nut, the shoulders at the ends of the confronting cam surfaces being in abutment, and the holes in the two nuts being in registration.

Figure 4 is a detail sectional view appearing as though taken on the line 4—4 of Figure 3, illustrating how a cotter pin may be inserted in the registering holes, and also illustrating how the composite nut may then be screwed upon the bolt end.

Figure 5 is a perspective view of the main nut, particularly illustrating the notched edge of the upstanding flange.

The instant nut lock is an improvement on the nut lock in Patent No. 1,967,237 of July 24, 1934 to Claude F. Freeland. The outstanding features of the improvement are enumerated in the foregoing statement of the objects of the invention, and to make these clear attention is directed to the drawing. I designates any cylindrical member, for instance a bolt, which is threaded at 2. The composite nut 3 comprises the main nut 4 and check nut 5.

These nuts have thread passages 6, 7. These passages must be alined in order that the composite nut may be initially screwed onto the threads 2. This alinement is rapidly and accurately accomplished by setting one nut upon the other, whereupon a cylindrical upstanding flange 8 on one of the nuts, the main nut 4 in this instance, telescopically fits into a corresponding circular chamber 9 in the other nut.

Around the outer wall of the flange 8 there is a ramp 10 which is 360° in extent, starting at one vertical extremity of an upright shoulder 11 and ending at the other extremity. The check nut has a corresponding ramp 12. This also includes an upright shoulder 13. Upon bringing these shoulders together after interfitting of the flange 9 and chamber 10 the internal thread passage will be continuous, and the composite nut can be screwed upon the bolt 1.

In this condition of the composite nut there is registration of holes 14, 15 in the respective main and check nut. A cotter pin 16, or its equivalent, is inserted clear through (Fig. 4) thereby to keep the proper main and check nut pair together for the purpose of shipment. The small end of the cotter pin may be bent a little in order to insure keeping the three parts together. It is immaterial whether or not the composite nut is shipped separately or screwed upon a bolt as shown in Figure 4. The main purpose of registration of the holes 14, 15 is to provide for the reception of a pin to temporarily keep the two nuts together. At this particular time the two nuts are at their loosest, the shoulders 11, 13 being in abutment.

Upon screwing the composite nut in the foregoing position upon the bolt end, locking is intended to follow, and that is accomplished in this way: The main nut 4 is appropriately held, for instance, by means of a wrench or by screwing it hard against an abutment, (not shown). This act of screwing can be accomplished by applying the wrench to the check nut 5. The pressure is transmitted from the shoulder 13 to the shoulder 11, serving to screw the main nut 4 down hard.

The check nut 5 is then backed up by turning it reversely as far as it will go. As the ramp 12 rides up the ramp 10 there will follow a powerful jamming action of the check nut 5 against the threads 2. The shoulders 11, 13 will separate, as seen in Figure 1, exposing a notch 17 in the edge of the upstanding flange 8. There may be several of these notches, and if the check nut 5 can be counter-turned far enough to expose the most remote notch, the jamming action of the check nut on the threads 2 will be all the more powerful.

It is to be observed that the bottom 18 of each notch is formed on a gradual outward curve (Figs.

2 and 5). This is intended to easily turn the point 19 of the cotter pin 16 when driven in. For this purpose the notch 17 selected for the occupancy of the point of the cotter pin must register with the hole 15, which was formerly used to merely contain the cotter pin in aiding to keep the two nuts together.

Having registered the hole 15 with the desired notch 17, the cotter pin is inserted and driven down, the point 19 is deflected outwardly by the curved bottom, and it emerges from the space produced by the separated shoulders 11, 13. If desired (and if long enough) the point can be hammered down over the main nut 4 so as to make doubly sure of retaining the cotter pin. It is ordinarily impossible to remove the composite nut from the bolt without first turning the check nut 5 in the original direction. This must be done relatively to the main nut 4 until the shoulders 11, 13 reabut to reestablish the looseness. But this turning is impossible as long as the point 19 of the cotter pin stands in the way of the shoulders 13.

Alinement marks 20, 21, respectively on the main and check nuts 4, 5 are added to facilitate the insertion of the cotter pin 16. The marks 20 represent the notches 17, while the mark 21 represents the hole 15. One or the other of the notches is in position to clear the shoulder 13 when the respective mark 20 registers with 21. The user then knows that he can drive the cotter pin through, without having to peer into the recess between the shoulders 11, 13. As many marks may be added as may be thought necessary, the ones shown being thought sufficient for illustration.

I claim:—

1. A nut lock comprising main and check nuts, contacting ramps on the nuts, said ramps having shoulders, an interfitting cylindrical flange and circular chamber on and in the respective nuts, the flange on one nut having notches opening outwardly of the nuts and the other nut having a hole, a pin insertable in the hole and through one of the notches, and marks on the respective nuts, said marks registering when one of the notches clears the shoulder of said other nut upon separation of said shoulders by a counterturn of said other nut on a threaded member mutually carrying both nuts.

2. A nut lock comprising a main nut having a hole, a check nut having a hole, a pin by which to secure the nuts together, said main and check nuts having threaded passages, a cylindrical flange on one of the nuts surrounding the respective passage and a circular chamber in the other nut coaxial with the respective passage and containing said flange, confronting ramps on the nuts respectively surrounding the flange and chamber and including abuttable shoulders, and a notch in the flange of said one nut, the hole in the other nut serving the double purpose of registering with the hole in said one nut and subsequently with the notch, each time to receive the pin, first to loosely hold the shoulders in abutment to insure continuity of the thread passages, second to lock the nuts when turned relatively to each other upon a threaded member to disengage the shoulders.

3. A nut lock comprising a main nut, a check nut having a hole, a pin by which to secure the nuts together, said main and check nuts having threaded passages, an interengaged cylindrical flange and circular chamber on the main nut and in the check nut concentric with the axis of the nuts, confronting ramps on the nuts having shoulders which loosely abut to insure the continuity of the thread passages when screwing the nuts onto a threaded member but which are spaced when the check nut is counter-turned on said member to jam the ramps, and a notch in the edge of the cylindrical flange then registering with said hole and communicating with said space, the bottom of the notch being rounded to conduct its end out into the space when the pin is driven through the hole.

CLAUDE L. FREELAND.